Figure 1:
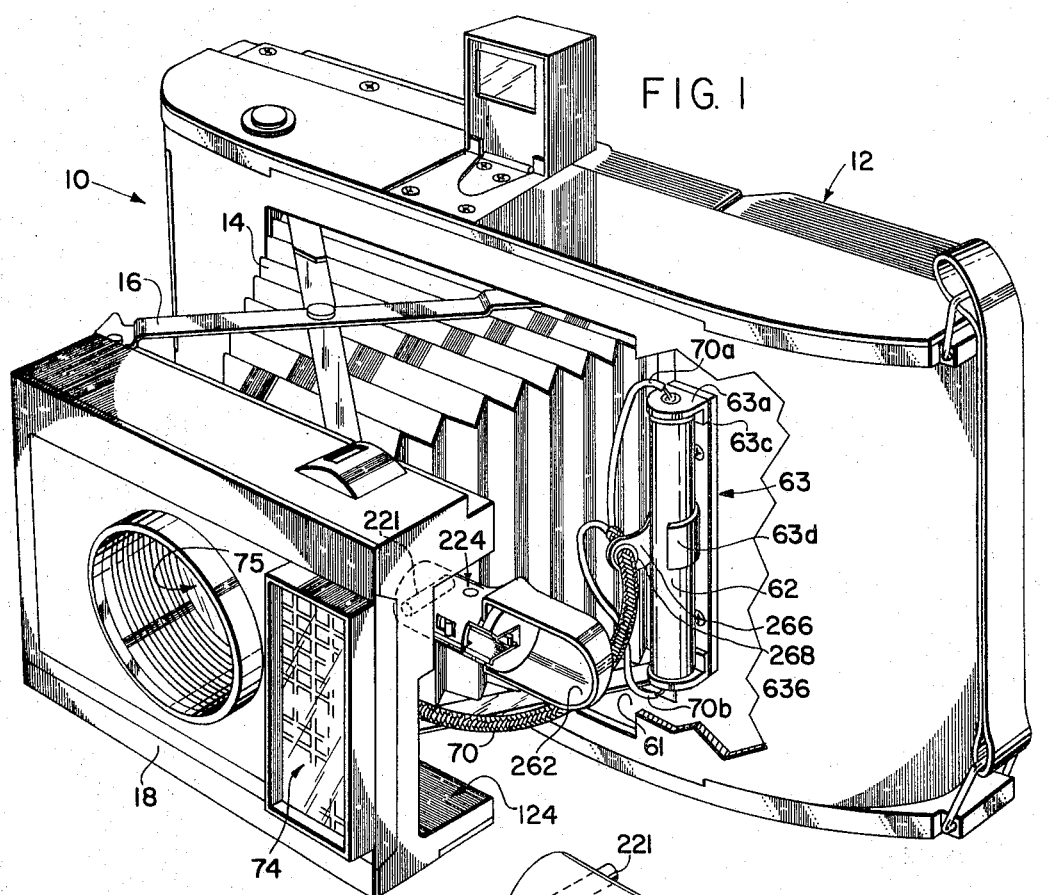

Jan. 3, 1967  E. H. LAND ETAL  3,295,426
RADIO TRANSMITTER-CAMERA COMBINATION
Original Filed April 10, 1961

INVENTORS
Edwin H. Land
Richard J. Chen
John W. Lothrop
Richard R. Wareham
BY Brown and Mikulka
and
Donald W. Sandler  ATTORNEYS United States Patent Office 3,295,426
Patented Jan. 3, 1967

3,295,426
RADIO TRANSMITTER-CAMERA COMBINATION
Edwin H. Land, Cambridge, Richard J. Chen, Brockton, John W. Lothrop, Westwood, and Richard R. Wareham, Marblehead, Mass., assignors to Polaroid Corporation, Cambridge, Mass., a corporation of Delaware
Original application Apr. 10, 1961, Ser. No. 102,047, now Patent No. 3,194,137. Divided and this application July 13, 1964, Ser. No. 382,280
4 Claims. (Cl. 95—11.5)

This application is a division of copending parent application Serial No. 102,047, filed April 10, 1961, now Patent No. 3,194,137, and is filed as a result of a requirement for restriction in the parent application.

The invention disclosed and claimed herein relates generally to a camera construction by which the capability of taking pictures under flash conditions is improved. As is well known to those skilled in the photographic art, there are certain situations wherein the illumination of the scene being photographed by a flash bulb mounted in the conventional flash bulb socket of a camera will not yield a satisfactory photograph, and resort must be made to flash bulbs that are remotely located relative to the camera. In such case, it is necessary to synchronize the triggering of the remotely located flash bulb with movement of the shutter mechanism of the camera; and it is the primary object of the present invention to provide a combination which materially facilitates proper operation of a remotely located flash apparatus.

Briefly, the invention involves a camera construction wherein a radio transmitter is designed to be mechanically and electrically mounted in the flash bulb socket of the camera for the purpose of generating an actuating signal in response to the closing of the flash contacts associated with the shutter mechanism, such actuating signal serving to trigger flash apparatus remote from the camera. The advent of miniature, battery operated oscillators permits the transmitter size to be so reduced that the housing containing the transmitter can be mechanically mounted on the camera simply by plugging the housing directly into the flash bulb socket in place of a flash bulb. Suitable contacts on the housing electrically engage the contacts of the socket with the result that the closing of the flash contacts in response to shutter movement can be utilized to cause the transmitter to generate an actuating signal, the battery provided for operating the flash bulb serving to energize the oscillator. Thus, there is eliminated any need for providing a separate mounting for the transmitter housing, a separate lead for the electrical connection to the flash contacts, and a separate battery for the transmitter.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 2:
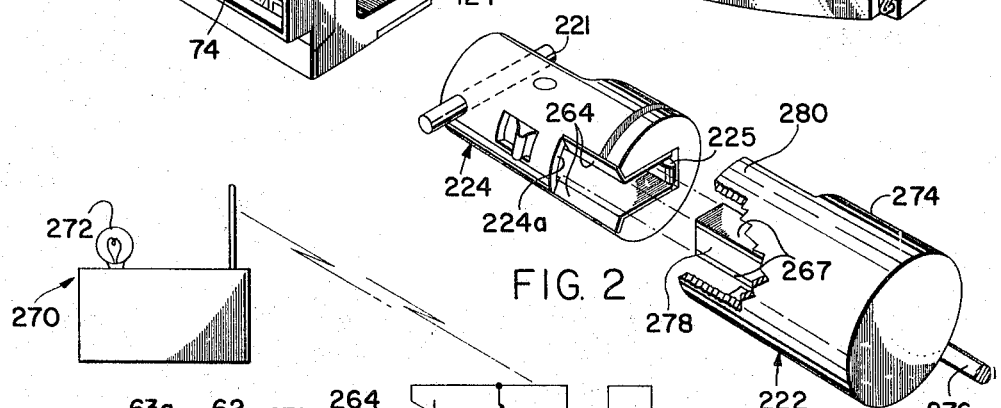
Figure 3:
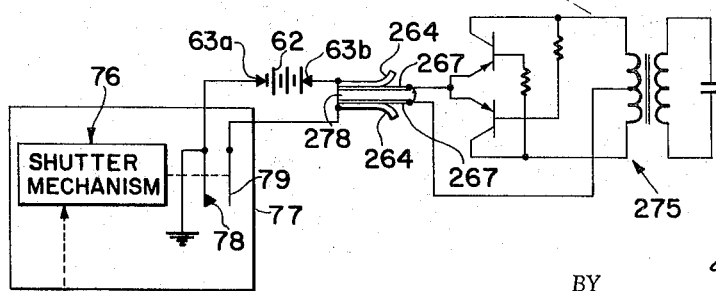

For a fuller understanding of the nature and objects of the invention, reference should be had to the following detailed description taken in connection with the accompanying drawings wherein:

FIGURE 1 is a perspective view of a camera (with portions broken away to better illustrate the battery which conventionally operates a flash bulb in response to the closing of the flash contacts of the shutter mechanism) and showing a retractable flash socket mounted on the camera in extended position;

FIG. 2 is an exploded view in perspective of the flash socket, with the reflector removed, and a miniature transmitter housing mechanically and electrically mountable on the socket; and FIG. 3 is a schematic diagram of the camera of FIGURE 1 showing the shutter mechanism, the flash contacts associated with the shutter mechanism and the oscillator circuit contained in the housing shown in FIG. 2 connected to the flash battery through the flash socket; all operably associated with a remote receiver that includes a flash bulb.

Referring now to the drawings, reference numeral 10 designates a typical hand-held camera of the folding type comprising main housing 12 containing apparatus by which film is positioned for exposure, bellows 14, scissors type erecting mechanism 16, and front 18, the latter containing the principal elements for accomplishing the photographic exposure.

The structure of housing 12 may contain film processing apparatus when the film to be used involves a diffusion transfer operation, although, for the purposes of this invention, details of such apparatus are not important. However, recess 61 in housing 12 adjacent bellows 14 provides a place to mount battery 62 which serves as a voltage supply for both the flash bulb and for a radio transmitter to be described. Battery 62 is releasably mounted in clip 63 formed of resilient pieces 63a and 63b which make electrical contact with opposite ends of the battery. These pieces are electrically insulated from each other by central insulating member 63c. Tab 63d of resilient material attached to member 63c is engaged with the battery when the latter is mounted between pieces 63a and 63b and serves to releasably retain the battery in mounted position. Tape 266 has one end attached to the central portion of the clip, and the other end, to which grommet 268 is attached, passes around the central portion of the battery and extends forwardly as shown. Electrical cable 70 passes through the grommet, the leads 70a and 70b of the cable being electrically connected to the respective end pieces 63a and 63b. To remove battery 62 from between the end pieces, cable 70 may be manually pulled outwardly causing tape 266 to exert an ejecting force on the battery.

The shutter of front 18 may contain photocell 74, lens 75, shutter mechanism 76 mounted on plate 77 (see FIG. 3), and circuitry (not shown) associated with photocell 74 and capable of establishing the exposure value (speed and/or diaphragm) of the mechanism, details of which are not pertinent to the present invention except to the extent that the mechanism is manually actuatable to effect the passage of a certain amount of light through the lens and onto the film and includes a pair of flash contacts 78 and 79 mounted on plate 77, the closing of such contacts being properly synchronized with the movement of the shutter blades of the mechanism in response to manual actuation theerof. As shown in the drawings, contact 78 is electrically connected to plate 77 which serves as the electrical ground for both the flash bulb circuit and the radio transmitter. As shown in FIGURE 1, flash bulb socket 224 is pivotally mounted at 221 in recess 124 which is formed in camera front 18 at the end thereof adjacent to photocell 74 such that the socket can be completely retracted into recess 124 or extended at various angles. Socket 224 includes cut-away portion 224a, bulb rejector 225 and a pair of socket contacts 264 adapted to electrically engage the electrodes of a flash bulb (type AG-1 preferably) when the latter is inserted between contacts 264. Reflector 262 is removably attached to socket 224 and cut-away portion 224a permits a flash bulb to be inserted into the socket without removing the reflector. However, the reflector is of such size, that the socket, with reflector attached thereto, can be retracted into recess 124. In normal use, the operator would extend socket 224 as shown in FIGURE 1, insert a flash bulb in the socket and take a picture by manually actuating the shutter mechanism. The initial movement of the shutter blades would close flash contacts 78, 79 applying battery 62 across socket contacts 264 igniting the combustible material in the flash bulb.

In the event that the photographer wishes to utilize flash apparatus remote from the camera (as, for example, apparatus 270 which comprises a flash lamp 272 pulsed in response to a received radio signal), reflector 262 can be removed from the socket and radio transmitter 222 mounted thereon. Transmitter 222 comprises cylindrical housing 274 which may be formed of a molded, plastic insulating material, and contains electrical means 275 shown in detail in FIG. 3. Electrical means 275 is mounted on elongated insulating board 278, one end of which extends beyond the housing to form a plug which can be inserted between socket contacts 264. Opposite sides of the board, in the region which extends beyond the housing, are provided with "printed" terminals 267 that electrically engage the socket contacts when the transmitter is plugged into the socket. A half-circular shroud 280, integral with housing 274 partially surrounds terminals 267. The contents of the housing, which is a miniaturized oscillator, can be made small enough so that the housing is approximately the same size as reflector 262 and will readily fit into recess 124 of the camera front when the socket is pivoted to the retracted position. Antenna rod 276 may be encased in a suitable plastic material which, if desired, can be made integral with the housing. The antenna is so positioned relative to the housing that when the latter is plugged into the socket, the antenna does not contact the camera front or interfere with any of the operating elements. Preferably, socket 224 is pivoted in the position shown in FIGURE 1 when the remote flash apparatus is to be used so that the antenna projects outwardly for maximum effectiveness.

As shown in FIG. 3, electrical means 275 is of conventional design, being a simple inductively-loaded oscillator comprising a pair of 2N1637 transistors connected in push-pull to the primary winding of a transformer. The secondary winding of the transformer is connected across a capacitor, and the two windings are wound together on a ferrite rod which comprises the antenna. The transmitter thus defined is powered by battery 62 and will draw about 450 mw. when transmitting a C.W. signal at 40 kc. Such signal is generated when battery voltage is applied across terminals 267 and is strong enough to reach radio receiver 270 located as much as 30 feet away from the transmitter. Receiver 270, by conventional means (not shown) detects the 40 kc. signal and produces a control signal which triggers flash lamp 272.

Those skilled in the art will recognize that the present invention, in providing a housing containing electrical means, having a pair of terminals, for an actuating signal when a voltage is applied across the terminals, and being constructed and arranged so that it can be connected mechanically to a conventional flash bulb socket with each of the pair of terminals separately engaged with the contacts of the flash socket, permits a radio transmitter to be easily attached to a camera without providing for special mounting means and a special connection to the flash contacts. This new combination of elements, namely a camera having a flash socket, and a radio transmitter which can be plugged into the socket to both mechanically mount the transmitter on the camera and electrically connect the transmitter to the battery through the flash contacts, constitutes the present invention.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Photographic apparatus comprising:
   (a) a camera having a shutter mechanism by which a scene can be photographed;
   (b) flash contacts associated with said camera and closeable in synchronism with movement of said shutter mechanism;
   (c) a flash bulb socket having a pair of socket contacts adapted to engage the electrodes of a flash bulb when the latter is operatively inserted in said socket; and
   (d) a miniature radio transmitter constructed and arranged to be mounted on said flash bulb socket so as to be triggered into operation when said flash contacts close.

2. Apparatus in accordance with claim 1 including flash apparatus separate from the camera and actuatable by the operation of said transmitter.

3. In combination:
   (a) a camera having a shutter mechanism;
   (b) flash contacts actuated by said shutter mechanism;
   (c) flash apparatus including flash bulb socket means having a pair of socket contacts connected in series with said flash contacts;
   (d) radio transmitter means for transmitting a radio frequency signal for triggering remotely located flash apparatus; and
   (e) terminal means on said transmitter means adapted to be received in said flash bulb socket means in electrical engagement with respective socket contacts, whereby insertion of said transmitter means into said socket means enables said flash apparatus to be used for triggering remotely located flash apparatus in response to actuation of said shutter mechanism.

4. For use with a camera having flash contacts actuated by a shutter mechanism and flash apparatus including flash bulb socket means having a pair of socket contacts connected in series with said flash contacts, radio transmitter means for transmitting a radio frequency signal for triggering remotely located flash apparatus, comprising:
   (a) a housing;
   (b) oscillator means in said housing for generating and radiating an oscillatory signal;
   (c) terminal means adapted to engage socket contacts of flash apparatus when a portion of said transmitter means including said terminal means is inserted into flash bulb socket means of flash apparatus; and
   (d) conductor means for carrying electrical power from said terminal means to said oscillator means, whereby insertion of said transmitter means into flash bulb socket means of flash apparatus enables the flash apparatus to be used for triggering remotely located flash apparatus in response to actuation of said shutter mechanism.

References Cited by the Examiner

UNITED STATES PATENTS

| | | | |
|---|---|---|---|
| 2,272,102 | 2/1942 | Wildman | 95—11.5 X |
| 2,408,764 | 10/1946 | Edgerton | 240—2 |
| 2,776,364 | 1/1957 | Daniels | 240—1.3 |
| 2,967,469 | 1/1961 | Lachaize | 95—11 |

JOHN M. HORAN, *Primary Examiner.*